2,951,666

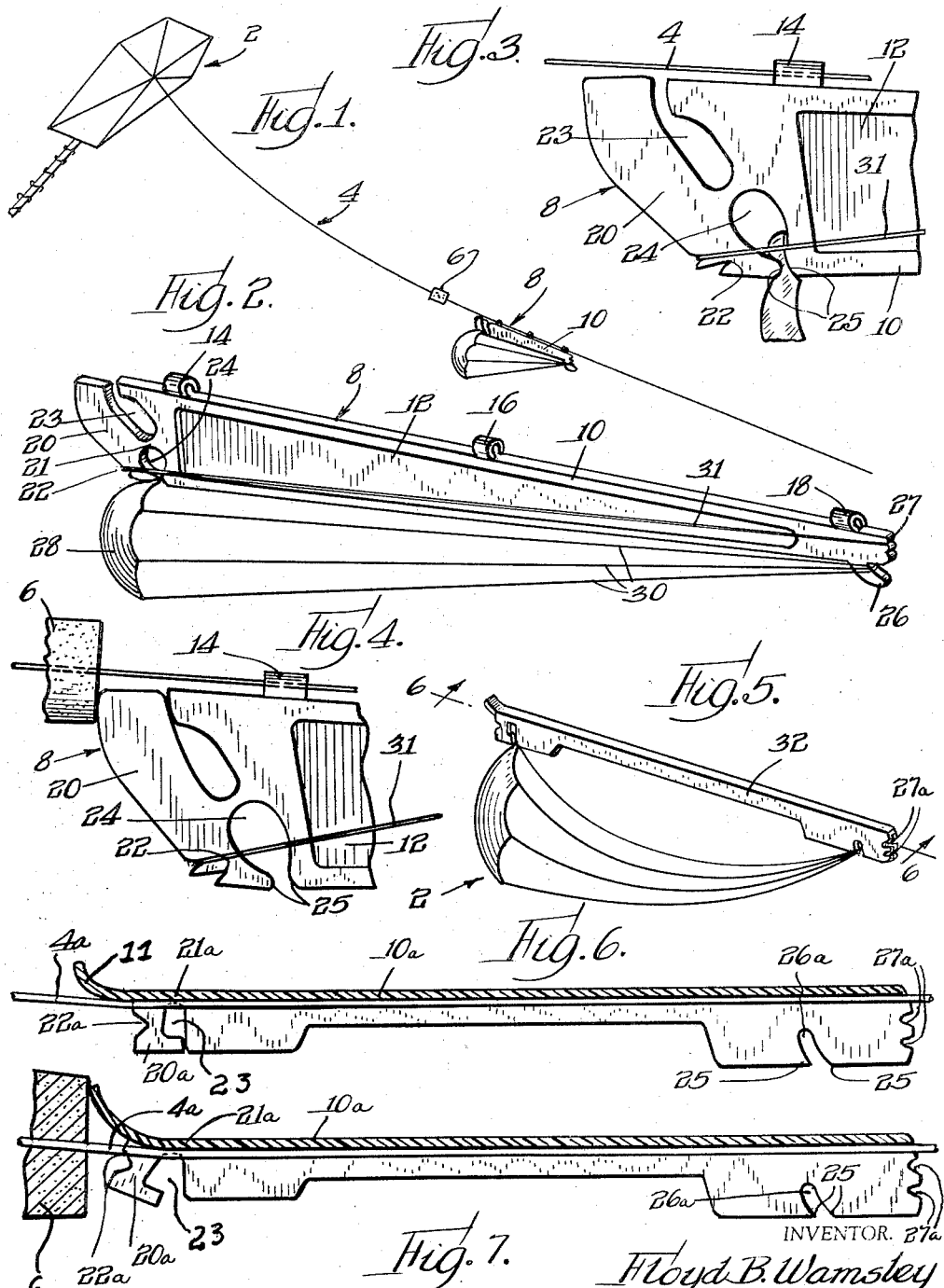

PARACHUTE ATTACHMENT FOR KITES

Floyd B. Wamsley, 336 N. Pennsylvania Ave., Glendora, Calif.

Filed July 9, 1957, Ser. No. 670,799

5 Claims. (Cl. 244—155)

This invention pertains to a device for use with kites, and more specifically, relates to a parachute carrier attachment to be used in conjunction with flying kites.

Heretofore, many inventors have attempted to make parachute release devices in various forms, which devices have all been complicated in nature because of the plurality of parts which were used in their construction. Furthermore, these devices were usually made of a combination of wood and metal or cardboard and metal which made them expensive to manufacture both from a raw material standpoint and an assembly standpoint.

It is an object of my invention to make a parachute carrier device for use with flying kites that is made preferably from plastic or other forms of moldable material, and is molded as a unitary structure.

It is still another object of my invention to produce a parachute release device which is made from a minimum of raw material to provide thereby an economical structure which can be produced and sold at an attractive price.

It is still another object of my invention to produce these structures from a material that has a low coefficient of friction such as for example plastics, so that upon repeated uses of the carrier device on the kite string little or no wear is apparent.

It is still another object of the invention to provide a device which is so designated that its weight characteristics are properly distributed to afford rapid return of the carrier after release of a parachute or similar object from same and which can be also readily pulled up the string of a flying kite by the use of the open parachute to the point of release.

It is still a further object of the invention to provide a carrying device wherein the major portion of the mechanism relating to the release of the parachute is located beneath a line coincident with the kite string. This avoids jamming or tangling of the mechanism with the string along which it runs.

These and other objects of the invention will be more fully understood and appreciated upon study of the attached description and claims, wherein:

Fig. 1 shows a kite in the air with one form of the mechanism coming within the scope of the invention which is shown positioned on the kite string.

Fig. 2 is a perspective view of the form of mechanism shown in Fig 1 in enlarged form with a parachute attached.

Fig. 3 shows a side view of the nose portion of the device which forms the means for releasing parachutes or other objects in accordance with the invention.

Fig. 4 is a side view similar to Fig. 3 wherein the so called trigger mechanism is shown in triggered position having just released a parachute or like object.

Fig. 5 shows a second form of the invention wherein a unitary molded carrier device is shown in perspective view with a parachute attached.

Figs. 6 and 7 are longitudinal sectional views of the carrier shown in Fig. 5 showing the carrier in its normal arrangement for carrying a parachute and after having been triggered respectively.

The carrier device as disclosed herein is referred to in the two embodiments shown by similar numbers to identify similar parts. In Figs. 1 and 2 the primary form of the invention is shown and identified by the numeral 8 and consists of a body portion 10 formed of relatively thin gauge moldable material, preferably plastic, having a recessed or relieved center portion to reduce the weight of the device and the cost of materials necessary to mold same. The body has a plurality of eyelets along its upper margin which for purposes of disclosure number three, and have suitably been identified by the numerals 14, 16 and 18. These eyelets are attached at one of their ends to the body but not attached at their other end so that a string can be mounted with facility through the opening into each of the eyelet. This, of course, avoids threading of the string and permits rapid assembly of the carrier thereon. Adjacent one end of the carrier is a nose portion 20 which is partially severed from the body so that it is attached to the body through a hinge or finger portion 21 which permits flexing of the nose portion 20 relative to the body 10. The aforementioned severances have been identified by the numerals 23 and 24 and by controlling their size, the desired flexibility of the nose portion 20 relative to the body 10 can be of a predetermined value. A plurality of notches 22 is provided adjacent the lower end of the nose portion to accommodate a rubber band whose operation will be hereinafter described. Adjacent the other end of the body a hook portion 26 is provided which may be used to hold the shroud strings 30 of a parachute if same is being carried aloft, and also a plurality of notches 27 are preferably provided similar to the notches 22 on the nose portion 20 to accommodate a rubber band whose operation will be hereinafter described.

In operation, the carrier is mounted on a kite string as previously mentioned and described, and a parachute is mounted, as best seen in Fig. 3, by flexing of the nose portion 20 to permit acceptance of parachute material between the gripping jaws 25 formed by the cooperating surfaces presented by the body portion 10 and the nose portion 20. The shroud strings can be mounted on the hook portion 26 so that as the parachute is exposed to the wind and opened up it will be held in that position to assure carrying of the carrier device along the kite string toward the kite. As the carrier approaches a cork or other obstacle mounted on the kite string at any desired position along its length the nose portion strikes the cork 6 or other object and is depressed to the position shown in Fig. 4 which opens the jaws 25 to release the parachute. As the parachute is released the wind draws it away from the carrier which substantially simultaneously accomplishes releasing of the shroud strings from the hook 26 and the parachute descends toward the earth. It will be noted that a rubber band is shown and identified by the numeral 31 being of suitable length to be stretched between the notches 22 in the nose portion and the notches 27 on the tail of the device. This rubber band is only needed where an auxiliary force is necessary to hold the clamping jaws 25 in clamped relation relative to each other. By selection of proper materials, the gripping jaws may be held in proper relation relative to each other without such spring urging means, and by suitable proportioning of the hinge be sufficiently strong to retain the parachute on the carrier during its ascent along the string. I have found, however, that by the use of a rubber band or other suitable spring means as previously described, as the carrier is used over and over, or in those situations where the hinge portion is not properly proportioned to assure clamping engagement of the parachute, that it serves as a simple and expedient means of eliminating such difficulties.

It will be understood by those versed in the art of parachute release devices that this one-piece form of carrier is extremely simple and could be made of relatively inexpensive material and proportioned to meet the requirements which have been previously mentioned.

A second form of the invention is shown in Figs. 5 to 7 and consists of a parachute carrier device having a body 10a consisting of preferably moldable material formed into a U-shaped cross section substantially throughout its length. The two flanges 32 of the U-shaped cross section provide a slot or trough into which the kite string 4a may be conveniently placed. The flanges 32 provide sufficient weight to assure the balanced position of the carrier relative to the kite string 4a. Adjacent one end of the body 10a is a nose portion 11 extending beyond the terminal end of the flanges of the body and preferably turned upward. This nose portion 11 is adapted to operate against a cork or abutment element 6 to release a parachute carried by the device as will be hereinafter described. Two flange portions 20a separated from the flanges 32 by a cutout portion 23 are adapted to clampingly impinge upon a parachute which is mounted between a clamping edge of the flanges 20a and the end edges of the flanges 32. As the nose portion 11 strikes the abutment 6, the flanges 20a are flexed away from the end edge portions of the flanges 32 and permit release of the parachute to float to earth. In the event the clamping force of the flanges 20a relative to the flanges 32 is not sufficient in nature to retain a parachute initially or after repeated use of the device, a rubber band should be provided between the notches 22a in the flanges 20a and the notches 27a provided in the trailing end margins at the terminal ends of the flanges 32. The rubber band when so mounted provides additional clamping force necessary to retain a parachute during the travel of the carrier up the kite string. Also provided in the vicinity of the trailing margins of the flanges 32 are cut outs 26a which provide a slot into which the shroud strings may be placed in a fashion similar to that described relative to the embodiment shown in Figs. 1 to 4 inclusive.

The similarity of the two devices which I have disclosed may be readily recognized in view of their one-piece construction, the use of integral elements to provide the clamping jaws to retain a parachute relative to the carrier during its travel up the kite string, the provision of an integral nose portion to permit the release of the parachute as it strikes an object mounted on the string and the use of integral elements to retain the carrier in mounted position on the string. In addition to the above, provision is made for the use of an elastic band or the like to obtain extra clamping pressure where such is desired.

It should be understood that I do not intend to be limited by the embodiments which I have shown to describe my invention.

What I claim is:

1. A one piece carrier attachment made of plastic material for use with kites comprising a body section of substantial longitudinal extent, means along the upper portion of said body to permit mounting of said body on a kite string with facility, an integral nose portion adjacent one end of said body portion resiliently connected to said body portion with means provided to cooporate with the adjacent body portion to form a jaw to clampingly impinge upon a complementary parachute element mounted therein, a portion of said nose portion in the vicinity of the upper portion of said body extending beyond the forward end of said body and adapted to cooperate with an abutment mounted on the kite strings to move the aforementioned nose portion thereby releasing the complementary parachute and means adjacent the other end of said body on which to mount the shroud strings of the complementary parachute during the ascent of said carrier along a kite string.

2. In a one-piece carrier attachment for use with a kite of the type described in claim 1 wherein the marginal edges of the nose portion and opposite end of said body are provided with notches to permit mounting of a spring member to accentuate the clamping force of the integral nose portion and the cooperating portion of the carrier body adjacent thereto.

3. A one piece carrier attachment for use with kites of the type set forth in claim 1 wherein the body of the carrier is U-shaped in cross section, the bight portion of the body providing the surface which permits mounting of the carrier on a complementary kite string and on which surface the carrier is propelled along said kite string by the complementary parachute member.

4. A one piece carrier device for use with kite comprising an elongated body member, integral means for attaching the carrier to a kite string, a nose portion resiliently connected to and extending from an end of said body member, said resilient connection of said nose portion with said body consisting of a portion of the body of predetermined and limited cross section located intermediate the upper and lower margins of said body member, said nose portion having means for cooperation with an adjacent portion of said body member to provide normally closed jaw-like means for releasably accepting an independent member therebetween, and means on said nose portion at the terminal surface end of said nose portion for engagement with an obstacle positioned on the kite string whereby said nose portion is moved and the normally closed jaw-like means open to release said independent member.

5. A device of the type claimed in claim 4 wherein means are provided on the nose portion in the vicinity of said jaw-like means and second means are provided on the body member at the end opposite the nose portion for cooperative acceptance of a spring member to facilitate the retention of said jaw-like means in a closed condition.

References Cited in the file of this patent
UNITED STATES PATENTS

| | | |
|---|---|---|
| 1,718,551 | Fisher | June 25, 1929 |
| 1,746,157 | Johnson | Feb. 4, 1930 |
| 2,680,584 | Lucci et al. | June 8, 1954 |

FOREIGN PATENTS

| | | |
|---|---|---|
| 590,621 | Great Britain | July 23, 1947 |